US009705395B2

United States Patent
Tomas et al.

(10) Patent No.: US 9,705,395 B2
(45) Date of Patent: *Jul. 11, 2017

(54) FAULT TOLERANT POWER SUPPLY INCORPORATING INTELLIGENT GATE DRIVER-SWITCH CIRCUIT TO PROVIDE UNINTERRUPTED POWER

(71) Applicant: Alpha and Omega Semiconductor Incorporated, Sunnyvale, CA (US)

(72) Inventors: Mark Tomas, San Mateo, CA (US);
Zhiye Zhang, San Jose, CA (US);
Allen Chang, Fremont, CA (US);
Kuang Ming Chang, Fremont, CA (US); Gilbert Lee, Seoul (KR)

(73) Assignee: Alpha and Omega Semiconductor Incorporated, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/792,965

(22) Filed: Jul. 7, 2015

(65) Prior Publication Data

US 2015/0311780 A1    Oct. 29, 2015

Related U.S. Application Data

(63) Continuation of application No. 13/950,146, filed on Jul. 24, 2013.
(Continued)

(51) Int. Cl.
H02M 3/158    (2006.01)
H02M 1/32    (2007.01)
(Continued)

(52) U.S. Cl.
CPC ............ *H02M 1/32* (2013.01); *H02H 7/1225* (2013.01); *H02H 9/02* (2013.01); *H02M 3/1584* (2013.01); *H02M 2001/0009* (2013.01)

(58) Field of Classification Search
CPC ............ H02M 1/32; H02M 2003/1586; H02H 7/1213
See application file for complete search history.

(56) References Cited

U.S. PATENT DOCUMENTS 4,659,942 A    4/1987    Volp
4,877,972 A    10/1989    Sobhani
(Continued)

FOREIGN PATENT DOCUMENTS

CN    87213546    8/1988
CN    102570400    7/2012
(Continued)

OTHER PUBLICATIONS

J. Tyster et al., "High-speed gate drive scheme for three-phase inverter with twenty nanosecond minimum gate drive pulse," Power Electronics and Applications, 2009. EPE '09. 13th European Conference on, Barcelona, 2009, pp. 1-10.*

*Primary Examiner* — Harry Behm
*Assistant Examiner* — Peter Novak
(74) *Attorney, Agent, or Firm* — Van Pelt, Yi & James LLP

(57) ABSTRACT

A fault tolerant power supply system includes at least one load switch configured to connect an input voltage to an output node of the load switch when the load switch is turned on and at least one power channel coupled to the load switch to receive the input voltage. The power channel is configured as a buck converter and includes at least a high-side power switch and a low-side power switch. The fault tolerant power supply system is configured to measure a current flowing through the low-side power switch, to determine that the current flowing through the low-side power switch has exceeded a current limit threshold, and to disable the low-side power switch and the load switch in response to the determination that the current flowing in the low-side power switch has exceeded the current limit threshold.

16 Claims, 6 Drawing Sheets

Related U.S. Application Data

(60) Provisional application No. 61/778,124, filed on Mar. 12, 2013.

(51) Int. Cl.
*H02H 7/122* (2006.01)
*H02M 1/00* (2006.01)
*H02H 9/02* (2006.01)

(56) References Cited

U.S. PATENT DOCUMENTS

| | | | | |
|---|---|---|---|---|
| 5,172,073 | A | * | 12/1992 | Fujii ................ H03F 1/308 330/255 |
| 5,610,452 | A | * | 3/1997 | Shimer ............ H01J 37/241 307/89 |
| 5,745,670 | A | | 4/1998 | Linde |
| 5,894,415 | A | | 4/1999 | Habegger |
| 6,031,743 | A | * | 2/2000 | Carpenter ........... H02J 1/102 307/48 |
| 9,112,422 | B1 | | 8/2015 | Vinciarelli |
| 9,263,876 | B2 | | 2/2016 | Jiang et al. |
| 2003/0021113 | A1 | | 1/2003 | Begemann |
| 2005/0275393 | A1 | | 12/2005 | Knoedgen |
| 2008/0012542 | A1 | | 1/2008 | Liu et al. |
| 2008/0297957 | A1 | * | 12/2008 | Mehas ................ H02M 1/32 361/18 |
| 2009/0168469 | A1 | | 7/2009 | Dishman |
| 2011/0080156 | A1 | | 4/2011 | Briere et al. |
| 2012/0086402 | A1 | | 4/2012 | Carder |

FOREIGN PATENT DOCUMENTS

| | | |
|---|---|---|
| TW | 200910729 | 3/2009 |
| TW | M368127 | 11/2009 |
| TW | 201105003 | 2/2011 |
| TW | 201125249 | 7/2011 |
| TW | 201244354 | 11/2012 |

* cited by examiner

FAULT TOLERANT POWER SUPPLY INCORPORATING INTELLIGENT GATE DRIVER-SWITCH CIRCUIT TO PROVIDE UNINTERRUPTED POWER

CROSS REFERENCE TO OTHER APPLICATIONS

This application is a continuation of U.S. patent application Ser. No. 13/950,146, entitled FAULT TOLERANT POWER SUPPLY INCORPORATING INTELLIGENT GATE DRIVER-SWITCH CIRCUIT TO PROVIDE UNINTERRUPTED POWER, filed Jul. 24, 2013, now U.S. Pat. No. 9,106,075, issued Aug. 11, 2015, which is incorporated herein by reference for all purposes, which claims priority to U.S. Provisional Patent Application No. 61/778,124, entitled FAULT TOLERANT POWER SUPPLY INCORPORATING INTELLIGENT GATE DRIVER-SWITCH CIRCUIT TO PROVIDE UNINTERRUPTED POWER, filed Mar. 12, 2013, which is incorporated herein by reference for all purposes.

BACKGROUND OF THE INVENTION

Many electronic systems, such as servers or microservers, require a reliable and uninterrupted source of power. In a power supply system providing uninterrupted power supply, backup or redundant power supplies are mounted in parallel with the main power bus line. FIG. 1 illustrates a conventional power supply system where a redundant power supply is coupled in parallel to the main power supply line. Referring to FIG. 1, a power supply system 1 includes a main power supply line 2 and a redundant power supply 3. The redundant power supply 3 is usually mounted in parallel using an OR'ing method, denoted by OR'ing circuit 4. The backup power supply 3 remains dormant and on standby mode for the most part of its existence and is only in operation when the main line 2 experiences an unscheduled downtime or when maintenance services are performed. The purpose of the redundant supply 3 is to immediately turn on in the event that the main power line 2 experiences fault, hence, providing uninterrupted operation or service to the end user. Typically, the redundancy power line 3 has the ability to flag or notify the system that it has been enabled, thus allowing for maintenance or service to the main line 2 at a more convenient time.

Mounting the redundant power supply in parallel to the main line by means of OR'ing can be done by the conventional diode method, which provides a blocking mechanism when there are no fault conditions. However, during a fault condition, the drop across the diode can result in significant power loss, especially when the power system is operating at a high current level, such as the current level often required by micro-servers and other hardware in telecommunication applications, which can be well above 80 A.

The OR'ing of the redundant power supply can also be done by using a MOSFET switch with very low ON-state resistance. Using a MOSFET switch for the OR circuit will require good control and sense circuitry that is governed by accurate timing and sequencing. The MOSFET OR'ing scheme provides lower power loss and improves efficiency during "backup" events but can be disadvantageous during the unlikely event that the secondary (redundant) line's input voltage fails and drops, causing reversal of current since the MOSFET switch allows for bi-directional conduction. MOSFET switch in series with back to back body diodes can be an option to prevent reverse current flow from occurring but will require timing circuitry for accurate sequencing.

The redundant power supply and the OR'ing circuit increases system cost in addition to consuming real estate space, the cost and space being used for a redundant system that is primarily inactive. Data centers and telecommunication infrastructure applications strive for lower server profile, tighter rack space, higher power density designs and lower cost. The requirement to include a redundant line increases the complexity of the power supply system as an intelligent controller for the fault detect circuits, current sensing capability for current limiting, current reversal detectors, break before make housekeeping circuits for accurate timing and other aforementioned circuits accessories need to be incorporated in the redundant power supply system. The complexity of the redundant power supply increases system cost and takes up valuable PC board real estate.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a fault tolerant power supply system incorporates an intelligent gate driver/MOS switch circuit with current detection to detect and decouple problematic power channels from the power supply system so that the power supply system can continue to operate to provide uninterrupted power to the output. In some embodiments, the intelligent gate driver/MOS switch circuit detects for a large DC surge current at the low-side MOS switch and generates a fault signal when a current exceeding a given threshold is detected. The fault signal is used to turn off the low-side MOS switch to discontinue the surge current. The fault signal is also used to generate a fault flag signal which can be used to turn off the load switch to discontinue the supply of input power to the power channel. Meanwhile, the remaining power channels of the power supply system continue to operate to generate the output voltage. The multi-phase controller of the power supply system monitors the output voltage and may adjust its power supply operation using the remaining functional power channels.

Figure 1:
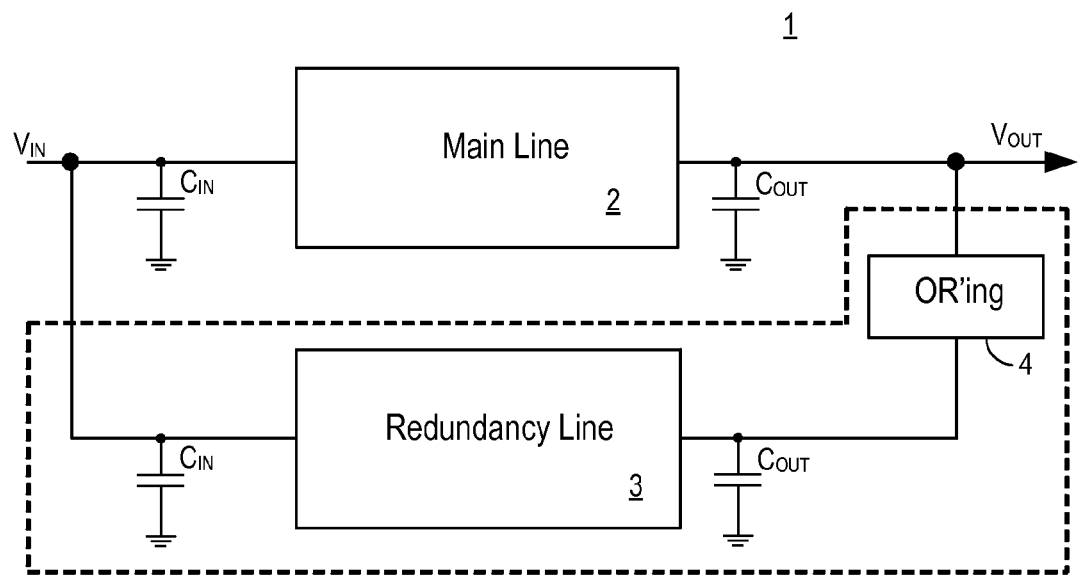
FIG. 1 illustrates a conventional power supply system where a redundant power supply is coupled in parallel to the main power supply line.
Figure 2:
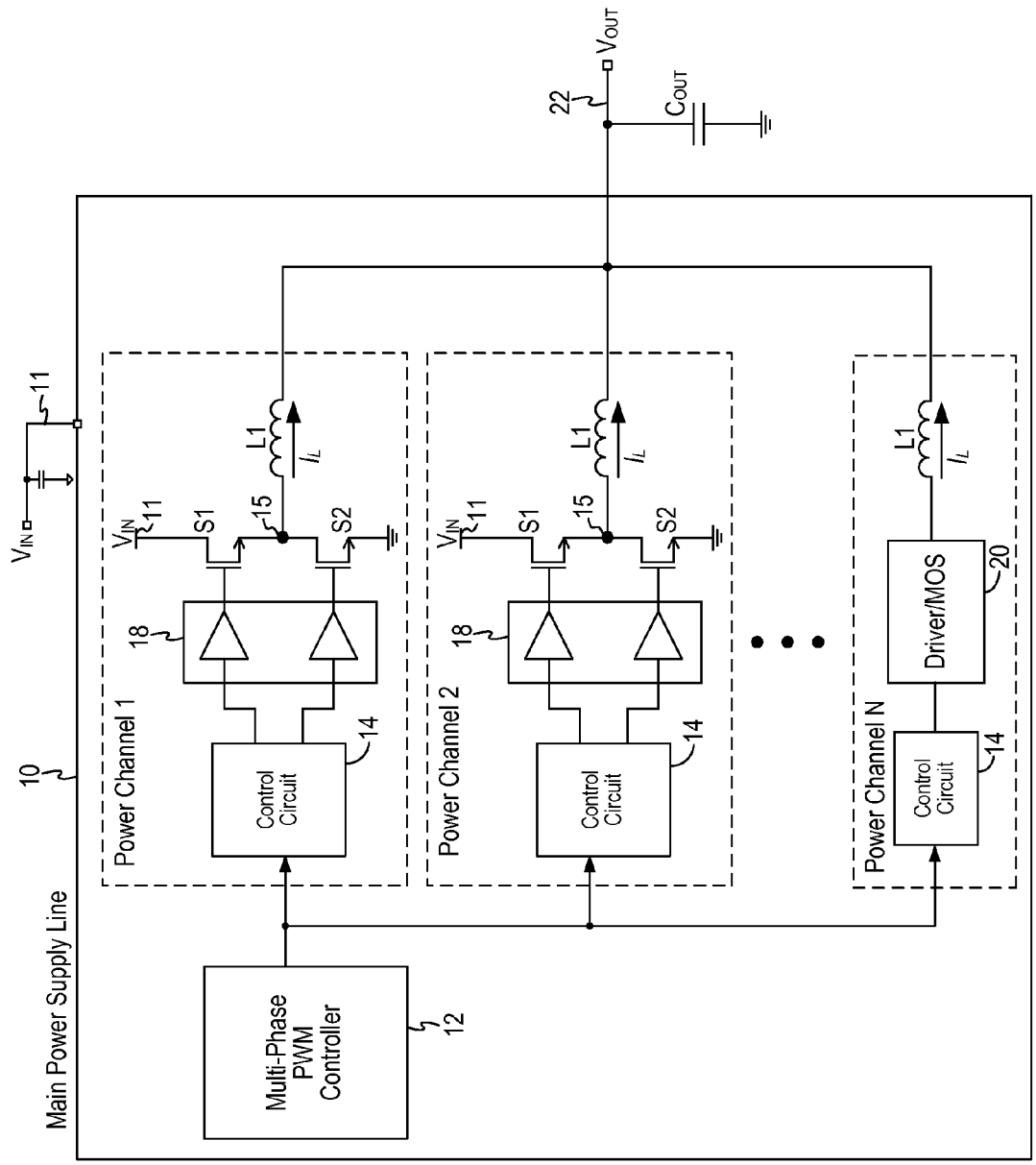
FIG. 2 is a schematic diagram of a conventional main power supply line.

FIG. 2 is a schematic diagram of a conventional main power supply line. Referring to FIG. 2, the main power supply line 10 receives an input DC voltage $V_{IN}$ (node 11) and generates an output voltage $V_{OUT}$ (node 22). The main power supply line 10 is typically configured to include multiple power channels (channel 1 to channel N). The power channels operate in different phases and are controlled by a multi-phase PWM controller 12. Each power channel includes a control circuit 14 receiving the PWM control signals from the controller 12. Each power channel further includes a driver circuit 18 driving a pair of MOS switches S1 and S2 as the high-side switch and the low-side switch. The control circuit 14 generates gate drive signals for the driver circuit 18 which then drives the MOS switches S1 and S2. The common node 15 between the switches S1 and S2 is coupled to an inductor L1. The output node of the inductor (node 22) of all the power channels are joined together and coupled to an output capacitor $C_{OUT}$ to generate the output voltage $V_{OUT}$. The power channel is configured as a buck converter. The operation of a buck converter to generate a switching signal at node 15 is well known and will be generalized as follows. The buck converter includes a pair of power switches S1 and S2 which are turned on and off to regulate an output voltage to be equal to a reference voltage. More specifically, the power switches are alternately turned on and off to generate a switching output voltage at the common node, also referred to as the switching output node. The switching output node is coupled to an LC filter circuit including an output inductor and an output capacitor to generate an output voltage having substantially constant magnitude. The output voltage can then be used to drive a load.

In particular, the high-side power switch is turned on to apply energy to the output inductor of the output filter circuit to allow the current through the inductor to build up. When the high-side power switch is turned off, the voltage across the inductor reverses and the current through the inductor reduces during this period. As a result, the inductor current ripples above and below the nominal output current. A relatively constant output voltage is maintained by the output capacitor. The low-side power switch is turned on and off for synchronous control operation.

A common failure mode of the main power supply line 10 is a short condition at the high-side power switch S1. However, when just a power switch in one power channel fails, the entire main power supply line is brought down and the redundant power supply is brought on-line to supply power until repair to the main power supply line can be performed.

In embodiments of the present invention, the fault tolerant power supply system provides an uninterrupted and continuous power flow without the need for a redundant or back up power supply system. When a redundant power supply system is eliminated, the OR'ing circuit and the associated control circuit are also eliminated. Accordingly, the fault tolerant power supply system of the present invention can be applied to provide an interrupted source of power with reduced system cost and reduced footprint. Importantly, the fault tolerant power supply system eliminates the inefficiency of using a redundant power supply that is dormant most of the time.

Figure 3:
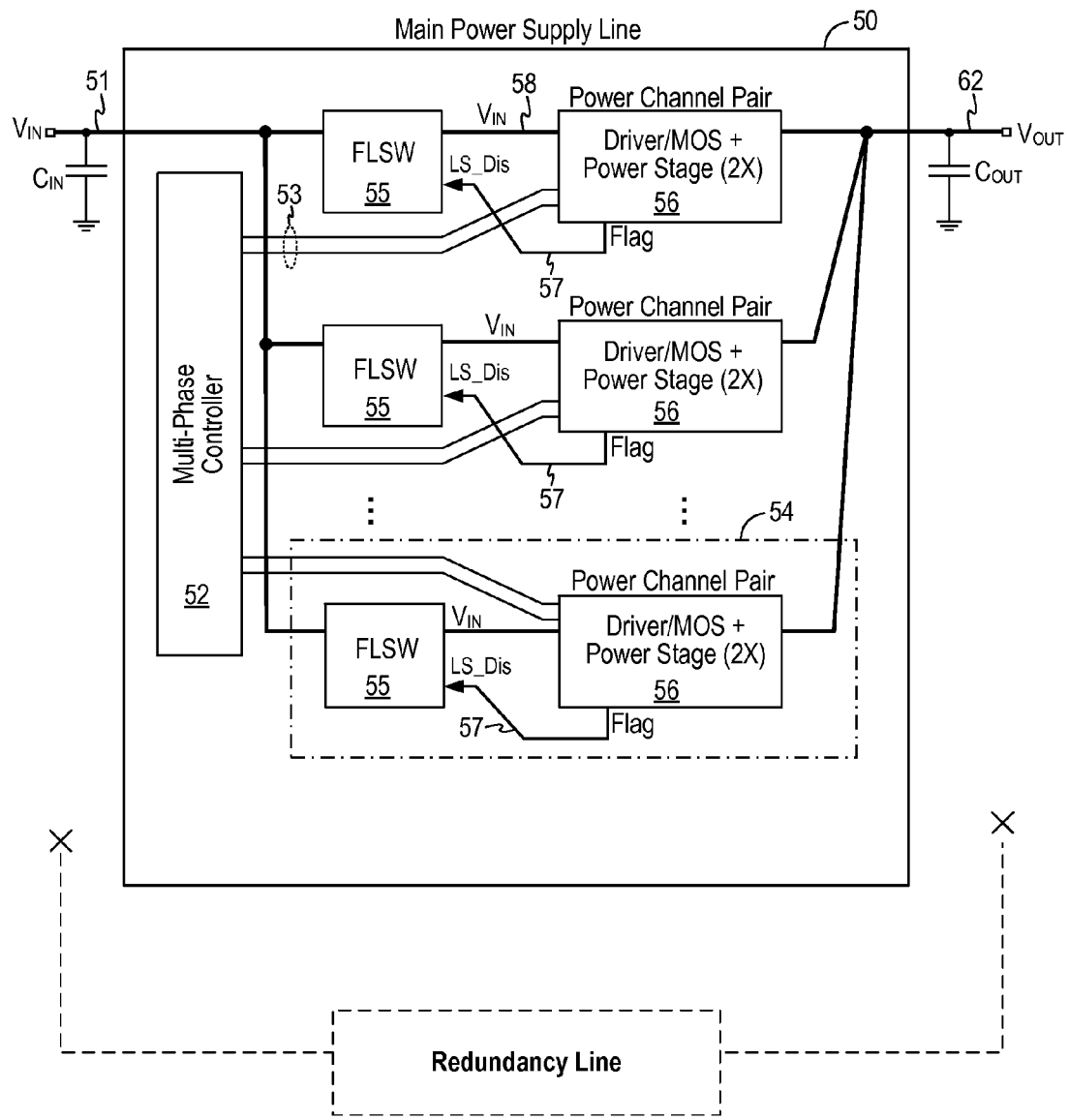
FIG. 3 is a schematic diagram of a fault tolerant power supply system in embodiments of the present invention.

FIG. 3 is a schematic diagram of a fault tolerant power supply system in embodiments of the present invention. Referring to FIG. 3, in the present illustration, the fault tolerant power supply system 50 ("power supply system 50") is applied in an application as the main power supply line to receive an input voltage $V_{IN}$ (node 51) and provide an output voltage $V_{OUT}$ (node 62). The input voltage $V_{IN}$ may be filtered by an input capacitor $C_{IN}$. The use of an input capacitor $C_{IN}$ at the input voltage node is optional and may be omitted in other embodiments of the present invention. The fault tolerant power supply system 50 includes N power channels where each power channel is configured as a buck converter and includes a driver circuit driving a high-side power switch and a low-side power switch. In the present embodiment, both the high-side and the low-side power switches are implemented using MOS transistors and are sometimes referred to as "high-side MOS switch" or "low-side MOS switch." In the present description, the combination of the driver circuit driving the high-side MOS switch and the low-side MOS switch is sometimes referred to as a gate driver/MOS switch circuit, or simply a "Driver/MOS circuit." In some applications, the Driver/MOS circuit is formed as a monolithic integrated circuit. Furthermore, in some embodiments, the low-side MOS switch and the high-side MOS switch are NMOS transistors.

The operation of a buck converter is well known and will be generalized as follows. The buck converter includes a pair of power switches S1 (high-side MOS switch) and S2 (low-side MOS switch) connected in series. The input voltage $V_{IN}$ is coupled to the drain terminal of the high-side MOS switch S1. The power switches S1 and S2 are turned on and off to regulate the output voltage $V_{OUT}$ to be equal to a reference voltage. More specifically, the power switches are alternately turned on and off to generate a switching output voltage at the common node, also referred to as the switching output node. The switching output node is coupled to an LC filter circuit including an output inductor and an output capacitor to generate an output voltage having substantially constant magnitude. The output voltage can then be used to drive a load. In the present description, only parts of the circuit elements of a buck converter relevant to the present invention are shown in the figures. It is understood that the power supply system and the buck converter may include other circuit elements or other control circuits not shown in the present figures to facilitate the normal operation of the power supply system and the buck converter in each power channel.

In the power supply system 50, the power channels operate in different phases and are controlled by a multi-phase controller 52, which can be a multi-phase PWM controller in some embodiments. The multi-phase controller 52 generates control signals 53, such as PWM control signals, which are coupled to each power channel to control the duty cycle of each power channel. In some embodiments, the power channels may have the same or different current rating. The power channels sum up to a common output voltage node 62 which generates the output voltage $V_{OUT}$ having a substantially constant magnitude over a range of load current conditions. When the output demands higher current, the multi-phase controller 52 adjusts the duty cycle of the PWM control signals 53 so that all power channels contribute evenly to the output. In some cases, the controller 52 may employ thermal and current balancing features, where the controller redistributes current sharing responsibilities to the phases or channels that are running cooler than the rest. In one embodiment, the fault tolerant power supply system 50 includes eight power channels. Each power channel supplies 20-30A to the output voltage node 62. The input voltage $V_{IN}$ can be 12V to 24V and the output voltage $V_{OUT}$ can be 1.2V to 5V.

In embodiments of the present invention, the fault tolerant power supply system 50 includes a set of load switches 55, each load switch 55 being connected to a pair of power channels 56 (also "a power channel pair"). In particular, a power channel pair 56 includes two parallely connected power channels where each power channel includes at least the driver circuit, the high-side MOS switch, the low-side MOS switch and the output inductor. In the present embodiment, each load switch 55 is coupled to two power channels and form a power channel section 54. In other embodiments, the load switch can be coupled to a single power channel or to two or more power channels. Furthermore, in the present embodiment, the load switch 55 is configured as a fast turn-off load switch (FLSW) incorporating a rapid switch turn-off circuit to facilitate rapid turn-off of the load switch when triggered.

In the present embodiment, a load switch 55 is connected in series between the input voltage $V_{IN}$ (node 51) and a power channel pair 56, in particular, to the input voltage node of the buck converter in each of the power channels. In operation, the load switch 55 is turned on to couple the input voltage $V_{IN}$ to the drain terminal of the high-side MOS switches of the power channels. Each power channel generates a switching output voltage that is filtered by the inductor at the respective power channel and the output capacitor $C_{OUT}$ at the output voltage node 62. In the present embodiment, the output nodes of the power channels are connected together at the output voltage node 62 to a common output capacitor $C_{OUT}$. In other embodiments, each power channel or a group of power channels may be provided with an individual output capacitor. The exact configuration of the output capacitor $C_{OUT}$ at the output voltage node 62 is not critical to the practice of the present invention.

According to embodiments of the present invention, the power supply system 50 incorporates power channels implemented with intelligent gate driver/MOS switch circuits. More specifically, the gate driver/MOS switch circuit in each power channel incorporates fault detection capability and generates a fault signal used to turn off the low-side MOS switch and the load switch associated with the power channel when a fault condition is detected. In most cases, a common fault condition in the power supply system 50 is a short circuit condition at the high-side MOS switch. When the high-side MOS switch is shorted, a direct path from the input voltage $V_{IN}$ to ground results when the low-side MOS switch is turned on, resulting in excessive current flowing through the power switches. The excessive current flow can lead to irreversible damage to the MOS switch circuits. In accordance with embodiments of the present invention, the gate driver/MOS switch circuit in each power channel detects an over-current condition at the low-side MOS switch and turns off both the low-side MOS switch and the load switch associated with the power channel to prevent further current flow.

In one embodiment, the Driver/MOS circuit in each power channel generates a fault signal when an over-current condition is detected which fault signal is used to turn off the low-side MOS switch in the driver/MOS circuit itself. The Driver/MOS circuit further generates a fault flag signal (node 57). The fault flag signal (node 57) is coupled to the load switch 55 as a load switch disable (LS_Dis) signal to disable or turn off the load switch. In the present embodiment, a pair of power channels is disabled when the load switch is open or turned off by the fault detection at Driver/MOS circuit.

When a load switch 55 is turned off to disable one or more power channels due to fault detection by the Driver/MOS circuit, the multi-phase controller 52 adjusts the duty cycle of the PWM signals 53 provided to the other power channels so that the desired output voltage $V_{OUT}$ is maintained. In this manner, an uninterrupted output voltage and current flow is provided to the output voltage node 62. More importantly, the power supply system 50 can provide uninterrupted power without the need of a redundant power supply system as in the conventional configuration.

Figure 4:
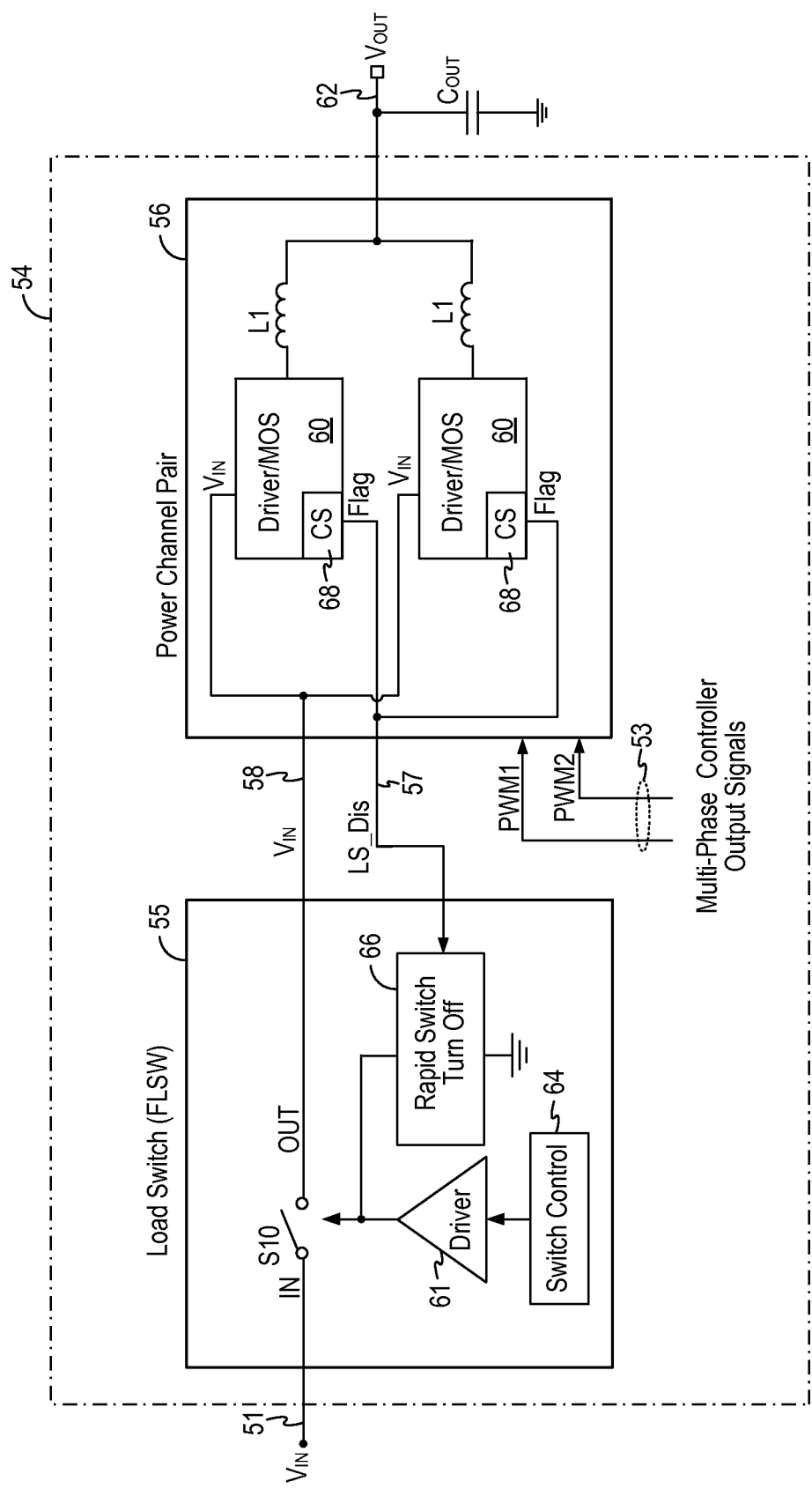
FIG. 4 is a schematic diagram illustrating the detail configuration of an intelligent gate driver/MOS switch circuit in each power channel coupled to a load switch in embodiments of the present invention.

FIG. 4 is a schematic diagram illustrating a detail configuration of an intelligent gate driver/MOS switch circuit in each power channel coupled to a load switch in embodiments of the present invention. Referring to FIG. 4, a power channel section 54 includes a load switch 55 coupled to a power channel pair 56. The load switch 55 connects the input voltage $V_{IN}$ (node 51) to the input voltage node of the MOS switches in each power channel. The input voltage node of the power channel is typically the drain terminal of the high-side MOS switch. More specifically, the load switch 55 includes a main switch S10 with an input node IN connecting to the input voltage $V_{IN}$ (node 51) and an output node OUT connecting to the input voltage node (node 58) of the power channels in the power channel pair 56. When main switch S10 is closed, the power channels in the power channel pair 56 are connected to the input voltage $V_{IN}$. When the main switch S10 is open, the power channels are no longer connected to the input voltage $V_{IN}$. The main switch S10 is driver by a driver 61 under the control of a switch control circuit 64. Switch control circuit 64 is configured to turn on or off the main switch 510 based on control signals from the power supply system 50. In the present embodiment, the load switch 55 is a fast acting load switch and is capable of being turned off quickly when triggered. To that end, the load switch 55 includes a rapid switch turn-off circuit 66 configured to turn off the main switch S10 very quickly when triggered by the load switch disable signal LS_Dis (node 57). The load switch disable signal is asserted when an over-current condition is detected at the Driver/MOS circuit of a power channel, as will be explained in more detail below.

In the power channel pair 56, each power channel includes an intelligent gate driver/MOS switch circuit 60 and an inductor L1. The output nodes of the pair of power channels are coupled to the output voltage node 62 to which the output capacitor $C_{OUT}$ is coupled. The power channels in the pair 56 operate under the control of PWM control signals 53 from the multi-phase controller 52 at specific duty cycles. The intelligent gate driver/MOS switch circuit 60 incorporates a current sense circuit 68 to detect a large DC surge current at the low-side MOS switch which indicates an over-current condition at the Driver/MOS circuit. In particular, the current sense circuit detects a peak current flowing in the low-side MOS switch. When a surge current, or a current exceeding a certain threshold, is detected at the low-side MOS switch, the intelligent gate driver/MOS switch circuit 60 turns off the low-side MOS switch and/or put the low-side MOS switch in a tri-state mode. Furthermore, the gate driver/MOS switch circuit 60 generates a load switch disable signal LS_Dis (node 57) which is coupled to the load switch 55 to activate the rapid switch turn-off circuit 66 to turn off the load switch 55. In particular, the rapid switch turn-off circuit 66, when triggered by the disable signal LS_Dis (node 57), opens or turn off main switch S10 quickly so as to terminate the connection between the input node IN and the output node OUT of the main switch S10. As a result, the input voltage node 58 of the power channels is no longer connected to the input voltage $V_{IN}$ (node 51). Accordingly, the load switch 55 operates to decouple a problematic power channel from the power supply system so that the power supply system can continue to operate using the remaining power channels to provide uninterrupted power to the output voltage node. In this manner, the power supply system 50 of the present invention implements fault tolerant design which enables the power supply system to continue operation, rather than failing completely, when a power channel of the system fails.

In embodiments of the present invention, the power channels in the fault tolerant power supply system 50 are formed as interchangeable components or are swappable so that a failed power channel can be swapped out while the rest of the power channels continue normal operation. In some embodiments, the Driver/MOS circuit of a power channel is formed as a swappable module. When a power channel fails due to a faulty high-side MOS switch, such as a shorted high-side MOS switch, the Driver/MOS circuit module can be swapped out while the remaining power channels supply the necessary power to the output voltage node. The power supply system 50 continues normal operation while the faulty Driver/MOS circuit is being replaced. The replaced Driver/MOS circuit module, once installed, can be powered up, such as by a soft-start operation, to the operating voltage before the replacement power channel is brought back on-line. The multi-phase controller 52 of the power supply system 50 monitors the output voltage $V_{OUT}$ and adjusts the phase of the PWM signals provided to each power channel to generate the desired output voltage value.

In some embodiments, the intelligent gate driver/MOS switch circuit generates a fault flag signal which is provided as an output signal of the power supply system where the fault flag is used to alert the operator of the power supply system of a faulty power channel.

Figure 5:
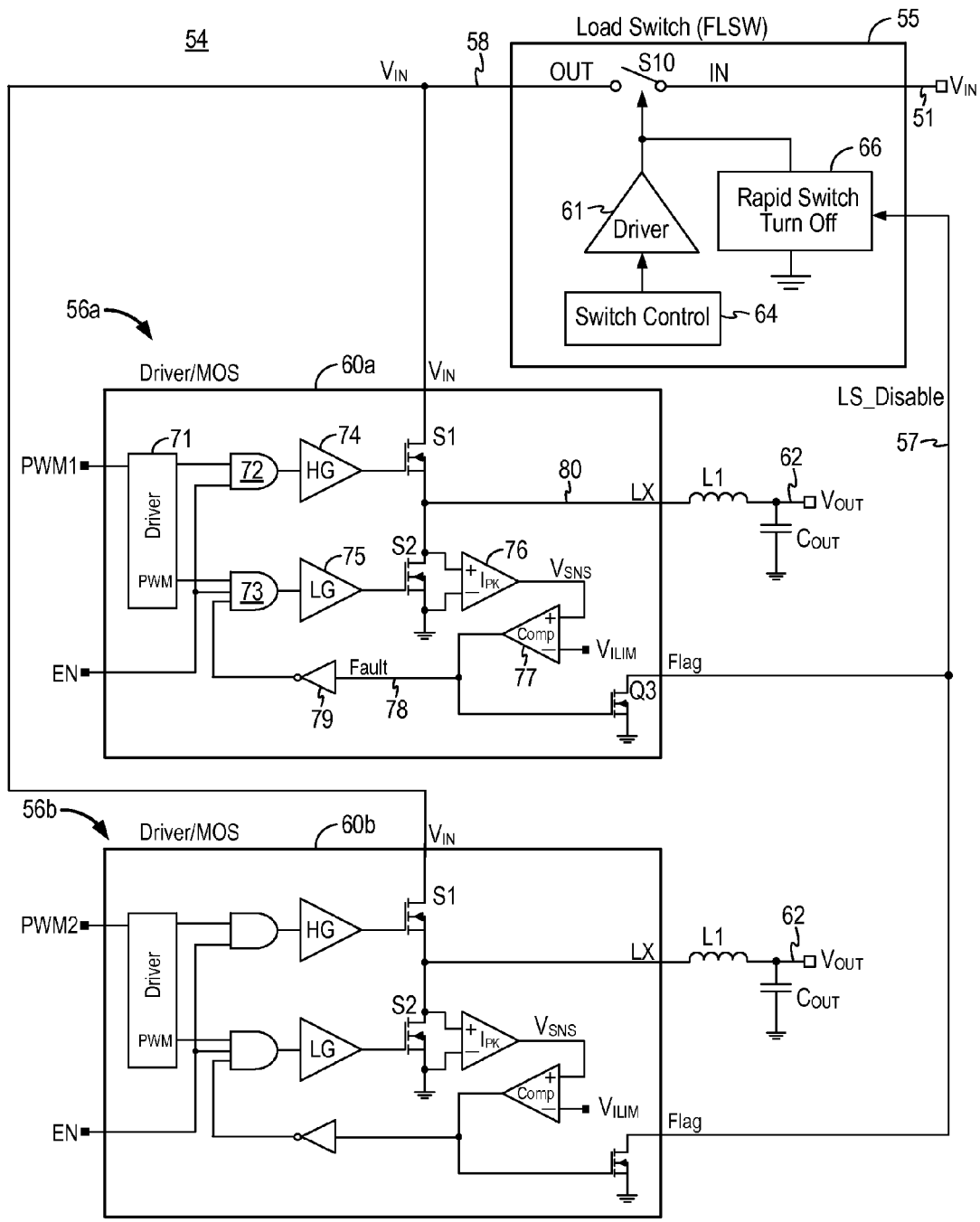
FIG. 5 is a schematic illustrating the circuit configuration of an intelligent gate driver/MOS switch circuit in embodiments of the present invention.

FIG. 5 is a schematic illustrating the circuit configuration of an intelligent gate driver/MOS switch circuit incorporated in each of a pair of power channels and a load switch coupled to the pair of power channels in embodiments of the present invention. In the present embodiment, each power channel is configured as a buck converter. The power channels in a power channel pair are configured in identical manner and description of one power channel is applicable to the other power channel. Referring to FIG. 5, a power channel section 54 includes a load switch 55 coupled to a pair of power channels 56a, 56b. In the present embodiment, the load switch 55 is configured in the same manner as the load switch in FIG. 4 and described above. Description of the load switch circuitry will not be repeated here. In brief, the load switch 55 connects or decouples the input voltage $V_{IN}$ (node 51) to the input voltage node 58 of the power channels 56a, 56b.

In the present embodiment, a power channel 56a includes a Driver/MOS circuit 60a and an inductor L1 configured as a buck converter. The power channel 56a is connected to the output voltage node 62 to an output capacitor $C_{OUT}$. The output capacitor $C_{OUT}$ is typically a common output capacitor shared by all power channels or a group of power channels. The Driver/MOS circuit 60a includes a driver circuit 71 receiving a PWM control signal PWM1. The driver circuit 71 generates control signals for the high-side gate driver 74 and the low-side gate driver 75. In the present embodiment, the control signals generated by the driver circuit 71 is logically AND'ed with other control signals, such as an Enable signal EN for the power channel. AND gates 72 and 73 may be used to gate one or more control signals to generate the gate drive signal for the high-side gate driver 74 and the low-side gate driver 75. The high-side gate driver 74 is configured to drive the gate of the high-side MOS switch S1 while the low-side gate driver 75 is configured to drive the gate of the low-side MOS switch S2. The common node 80 between the high-side MOS switch S1 and the low-side MOS switch S2 is the switching output node LX and is coupled to one terminal of the inductor L1. The other terminal of the inductor L1 is coupled to the common output voltage node 62 for the power supply system 50. The output capacitor $C_{OUT}$, which may be a common output capacitor for one or more or all power channels, is also coupled to the output voltage node 62. The control circuitry in the Driver/MOS circuit 60a, such as the driver circuit 71 and the AND logic gates 72, 73, are illustrative only. The control circuitry in the Driver/MOS circuit may have other circuit arrangements in other embodiments.

In a buck converter, the high-side MOS switch S1 and the low-side MOS switch S2 are controlled by the driver circuit 71, including the high-side gate driver 74 and the low-side gate driver 75, such that only one MOS switch is turned on at a time and both MOS switches are prevented from being turned on at the same time. Thus, in normal operation, there is no direct current path between the input voltage $V_{IN}$ (node 58) and ground. However, when the high-side MOS switch S1 is shorted out, a large surge current results when the low-side MOS switch S2 is turned on, creating a direct current path from input voltage $V_{IN}$ to ground. So when the high-side MOS switch S1 is shorted, the large surge current occurs when the high-side MOS switch S1 is turned off and the low-side MOS switch S2 is turned on. The intelligent gate driver/MOS switch circuit of the present invention senses the surge current at the low-side MOS switch S2 to detect the fault condition at the power channel and to initiate over-current protection operation.

Conventional power supply systems sometimes employ conventional load switches in series with the input voltage. In some cases, the load switch is left to withstand and sustain large amount of current during a short circuit event that ultimately leads to system catastrophic failure. Some conventional load switches include current limiting features that alert and trigger shutdown functions but the process of shutting down the load switch (or "opening" the switch) typically took a fairly long time to complete, for example, hundreds of micro-seconds. The power supply system may be irreparably damaged by the time the load switch is open in response to a current limiting event.

Some conventional load switches are designed with current clamping features where the internal control network of the load switch triggers a fixed maximum current level that cannot be exceeded to prevent further damage in the system. However, a current clamping load switch cannot be applied in multi-phase/multi-channel power supply system because the current clamping feature will disrupt the output voltage.

In embodiments of the present invention, the fault tolerant power supply system incorporates an intelligent gate driver/MOS switch circuit having over-current detection and protection. Furthermore, in some embodiments, the fault tolerant power supply system incorporates a load switch with fast turn-off capability. In one embodiment, the load switch has an overall turn off time in the nano-seconds range, for example, approximately 100 ns (over temperature variations). The turn off time refers to the time period from when a fault condition is detected to when the load switch is completely turned off. In general, the load switch incorporated in the power supply system of the present invention has an overall turn off time short enough to avoid peak current from being developed to cause components of the power supply system to exceed their thermal limits. In other words, the load switch is capable of rapid response so as to avoid excessive peak current being developed and thereby damaging the power supply system. In particular, the rapid and expedient decoupling of a failed power channel operates to mitigate and minimize peak current build up that is generated by the parasitic inductance and capacitance residing alongside the buck converter where the peak current build up can be damaging to other power channels and other circuitry of the power supply system.

Referring to FIG. 5, the intelligent gate driver/MOS switch circuit 60a incorporates a current sense circuit to sense the current at the low-side MOS switch S2. In one embodiment, the current sense circuit includes a peak current detector 76 coupled across the source and drain terminal of the low-side MOS switch S2 and a comparator 77 configured to compare the sensed signal to a threshold level. In particular, the peak current detector 76 detects the peak current value of the current flowing across the low-side MOS switch S2. The peak current detector 76 generates a sensed voltage signal $V_{SNS}$ indicative of the sensed peak current value across the low-side MOS switch S2. The sensed voltage signal $V_{SNS}$ is coupled to the positive input terminal of the comparator 77 to be compared with a threshold voltage $V_{ILIM}$ coupled to the negative input terminal of the comparator 77. The threshold voltage $V_{ILIM}$ represents the over-current threshold limit for the power channel.

When the sensed voltage signal $V_{SNS}$ is less than the threshold voltage $V_{ILIM}$ indicating that the current at the low-side MOS switch S2 is lower than the over-current threshold limit, the output signal of the comparator 77 is deasserted or at a logical low. The output of the inverter 79 is thus asserted or at a logical high and the AND gate 73 operates based on the other control signals only, that is, based on the PWM control signal from the driver circuit 71 and the enable signal EN only. When the current at the low-side MOS switch S2 exceeds the over-current threshold limit, that is, an over-current condition is detected, the comparator 77 generates a fault signal (node 78) as the comparator output signal which is used to turn off the low-side MOS switch S2. In particular, the output signal of the comparator 77 is inverted by an inverter 79 and the inverted fault signal is coupled to the AND logic gate 73 to gate the gate drive signal for the low-side MOS switch.

More specifically, when the sensed voltage signal $V_{SNS}$ becomes equal to or greater than the threshold voltage $V_{ILIM}$ indicating that the current at the low-side MOS switch S2 is equal to or higher than the over-current threshold limit, the output signal of the comparator 77 is asserted or at a logical high. The output of the inverter 79 is thus deasserted or at a logical low and the AND gate 73 is disabled. In that case, the low-side gate driver 75 is also disabled and will turn off the low-side MOS switch S2. In this manner, when the current sense circuit detects an over-current condition at the low-side MOS switch S2, the current sense circuit will generate a fault signal (node 78) to turn off the low-side MOS switch S2 or put the low-side MOS switch S2 in tri-state mode.

Meanwhile, the fault signal is also coupled outside of the Driver/MOS circuit 60a as a fault flag signal. In one embodiment, the fault signal (node 78) is an active high signal. The fault signal (node 78) is coupled to the gate of an open-drain NMOS transistor Q3. When the fault signal (node 78) is asserted, the NMOS transistor Q3 is turned on to pull down on the drain node of the transistor Q3, thereby generating the fault flag signal being an active low signal. The drain node of the transistor Q3 provides the fault flag signal (node 57) which is coupled to the load switch 55 as the load switch disable signal LS_Disable to the turn-off circuitry of the load switch 55 to turn off the load switch.

In one embodiment, the load switch disable signal LS_Disable (node 57) is coupled to trigger the rapid switch turn-off circuit of the load switch 55. In embodiments of the present invention, in the load switch circuit, the switch control circuit 64 is used to turn on the load switch, such as during soft-start. Because the main switch S10 in the load switch is a large device, the rapid switch turn-off circuit 66 includes a large driver capable of turning off the load switch quickly. In one embodiment, the rapid switch turn-off circuit 66 includes an active pull-down device. In some embodiments, the rapid switch turn-off circuit 66 is an NMOS transistor configured to pull-down on the gate of the main switch S10 to turn off the load switch. The rapid switch turn-off circuit 66 is capable of turning off the load switch quickly before irreparable damages occur to the power supply system.

In this manner, when there is a short circuit condition at the high-side MOS switch S1 of a power channel, the intelligent gate driver/MOS switch circuit 60 senses the surge current when the low-side MOS switch is turned on and is able to turn off the low-side MOS switch S2 and the load switch 55 quickly to avoid damage to other parts of the power supply system. In one embodiment, the over-current detection, fault recognition, driver disable and load switch turn-off operation are deployed within a short time duration, such as within 100 ns.

Figure 6:
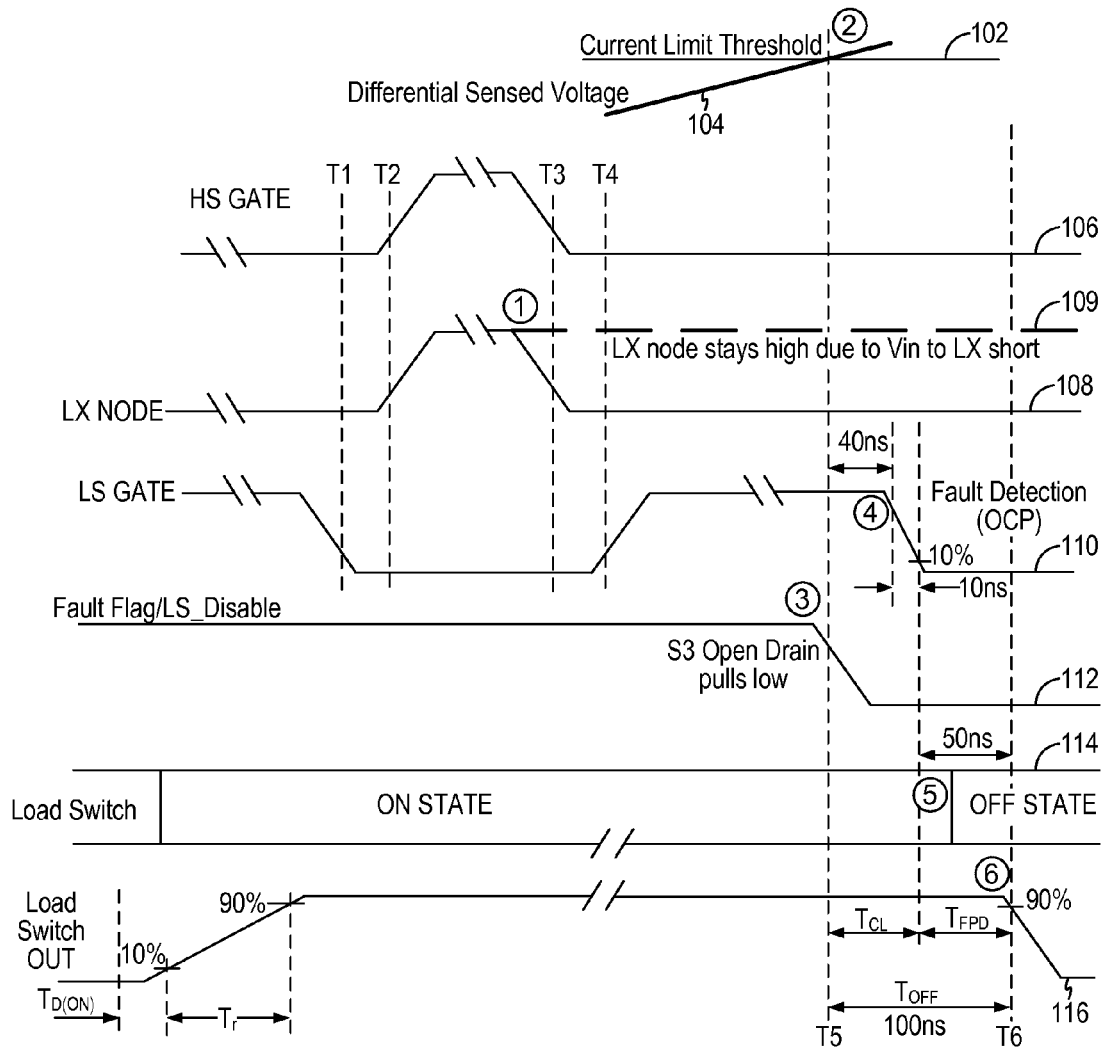
FIG. 6 is a timing diagram illustrating the operation of the intelligent gate driver/MOS switch circuit in an example of the present invention.

FIG. 6 is a timing diagram illustrating the operation of the intelligent gate driver/MOS switch circuit in an example of the present invention. Referring to FIG. 6, curve 102 denotes the over-current limit threshold and curve 104 denotes the sensed voltage signal $V_{SNS}$ indicative of the current flowing in the low-side MOS switch S2. Curve 106 denotes the high-side gate drive signal, curve 108 denotes the switching voltage node LX and curve 110 denotes the low-side gate drive signal. Curve 112 denotes the fault flag signal which is used as the load switch disable signal LS_Disable. Curve 114 denotes the on or off state of the load switch. Curve 116 denotes the OUT node of the load switch.

In normal operation, the load switch is turned on (ON-State) (curve 114). The load switch may be turned on through a soft-start operation such that the output node OUT node rises slowly to the full input voltage $V_{IN}$ (curve 116). When the output node OUT of the load switch is fully powered up, the power channels can start operation. At time T1, the low-side gate drive signal from the previous cycle is deasserted to turn off the low-side MOS switch. At time T2, the high-side gate driver signal (curve 106) is asserted to turn on the high-side MOS switch and the LX node (curve 108) switches high. When no over-current condition is detected, the fault flag signal (curve 112), being an active low signal, is asserted high. After a given duty cycle, at time T3, the high-side gate driver signal is turned off and the switching output node LX also switches low. Then at time T4, the low-side gate drive signal is asserted to turn on the low-side MOS switch. The operation cycle repeats in normal operation.

However, in the event that there is a short-circuit condition at the high-side MOS switch, the switching output node LX would remain high even after the high-side MOS switch is turned off (event 1 at time T3). As a result of the short condition, when the low-side MOS switch is turned on at time T4, the sensed voltage $V_{SNS}$ increases (curve 104). At some point, the sensed voltage $V_{SNS}$ exceeds the over-current limit threshold (curve 102, event 2). As a result of the sensed voltage $V_{SNS}$ exceeding the over-current limit threshold, at time T5, the fault signal in the intelligent Drive/MOS circuit is asserted and the fault flag is asserted low (curve 112, event 3). With the detection of the fault condition, the low-side gate driver signal is pull low (event 4) to disable the low-side MOS switch. Meanwhile, the fault flag signal also causes the load switch to turn off (curve 114, event 5). Because the load switch is typically a large device, a certain amount of time is required to turn off the load switch. At time T6, the load switch is finally turned off and the load switch output signal OUT finally decreases (event 6), indicating that the input voltage $V_{IN}$ has been decoupled from the load switch OUT node. In the present illustration, the time $T_{OFF}$ from detection of the fault condition (T5) to the turning off of the load switch (T6) is about 100 ns which ensures that no irreparable damage is done to the power supply system.

The fault tolerant power supply system of the present invention provides many advantages. First, the redundancy or back-up power system is eliminated in a power system requiring uninterrupted power. Eliminating the back-up power system results in significant cost and physical space savings. Instead of using a back-up power system, the main power line can be implemented using the fault tolerant power supply system of the present invention which incorporates intelligent gate driver/MOS switch circuit in each power channel.

Second, configuring the load switches at the input of each power channel pair prevents total system failure on the main line. The main line power system is now equipped with a mechanism that electrically disconnects the problematic power channel from the rest of the system before irreparable damages occur.

Third, in some embodiments, the fault tolerant power supply system of the present invention raises a fault flag after an over-current condition is detected and uninterrupted power flow continues. This fault flag can be used immediately as a disable signal to disable the troubled Driver/MOS circuit, such as to tri-state the MOS switches and other sub-circuitry that require necessary disabling, and also to turn off the load switch. The fault flag can be used to alert the system or a user of the problematic power channel.

Finally, the fault tolerant power supply system of the present invention can be implemented with swappable power channel components to enable the power supply system to be repaired while the system remains in full operation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A fault tolerant power supply system, the power supply system receiving an input voltage and generating an output voltage on an output voltage node, the power supply system comprising:
   a load switch having an input node coupled to the input voltage and an output node, the load switch providing the input voltage on the output node in response to the load switch being turned on and the load switch disconnecting the input voltage from the output node in response to the load switch being turned off, the load switch comprising a main switch connected between the input node and the output node and controlled by a control terminal and a turn-off circuit configured to drive the control terminal of the main switch;
   a plurality of power channels, each power channel having an input terminal coupled to the output node of the load switch and an output terminal coupled to the output voltage node of the power supply system, each power channel comprising a driver circuit, a high-side power switch and a low-side power switch connected in series, and an output inductor; and
   an output capacitor connected between the output voltage node and a ground potential, each power channel and the output capacitor forming a buck converter,
   wherein each power channel of the plurality of power channels further comprises a current sense circuit to measure a current flowing in the low-side power switch of the respective power channel, the current sense circuit being configured to generate a first output signal having a first state in response to the current flowing in the low-side power switch having a peak current value exceeding a current limit threshold, the first output signal being coupled to the driver circuit of the respective power channel to disable the low-side power switch of that power channel in response to the first output signal having the first state, the first output signal further being coupled to the turn off circuit of the load switch to turn off the load switch in response to the first output signal having the first state.

2. The fault tolerant power supply system of claim 1, wherein the load switch comprises a rapid switch turn-off circuit as the turn-off circuit, the rapid switch turn-off circuit configured to receive the first output signal and to drive the control terminal of the main switch to turn off the main switch in response to the first output signal having the first state.

3. The fault tolerant power supply system of claim 2, wherein the rapid switch turn-off circuit comprises a driver capable of turning off the main switch within a time duration to avoid damage to the power supply system.

4. The fault tolerant power supply system of claim 2, wherein the rapid switch turn-off circuit comprises a driver capable of turning off the main switch within a time duration in the nano-seconds range.

5. The fault tolerant power supply system of claim 1, wherein the output capacitor comprises a single output capacitor coupled to the output voltage node.

6. The fault tolerant power supply system of claim 1, wherein the current sense circuit in each power channel comprises:
   a peak current detector coupled to the low-side power switch and configured to measure a current flowing through the low-side power switch and to generate an output signal indicative of a peak current value of the current flowing through the low-side power switch; and
a comparator configured to compare the output signal of the peak current detector to the current limit threshold, the comparator generating the first output signal having the first state in response to the output signal of the peak current detector exceeding the current limit threshold.

7. The fault tolerant power supply system of claim 1, wherein the first output signal comprises an active high signal and the first state comprises a logical high state, each power channel of the plurality of power channels further comprises:
an open-drain NMOS transistor having a gate terminal coupled to the first output signal, a source terminal coupled to the ground potential, and a drain terminal providing a second output signal, the second output signal of each power channel being coupled to the turn-off circuit of the load switch to turn off the load switch in response to the first output signal having the first state.

8. The fault tolerant power supply system of claim 1, wherein the high-side power switch and the low-side power switch comprise MOS transistors.

9. The fault tolerant power supply system of claim 1, further comprising:
a multi-phase controller configured to generate control signals for the plurality of power channels to control the duty cycle of the power channels.

10. The fault tolerant power supply system of claim 1, wherein the load switch further comprises a first driver driving the control terminal of the main switch and a switch control circuit controlling the first driver and being configured to turn on or off the main switch in response to control signals of the power supply system.

11. A method in a power supply system, the power supply system receiving an input voltage and generating an output voltage on an output voltage node, the method comprising:
providing a load switch having an input node coupled to the input voltage and an output node, the load switch providing the input voltage on the output node in response to the load switch being turned on and the load switch disconnecting the input voltage from the output node in response to the load switch being turned off, the load switch comprising a main switch connected between the input node and the output node and controlled by a control terminal and a turn-off circuit configured to drive the control terminal of the main switch;
providing a plurality of power channels, each power channel having an input terminal coupled to the output node of the load switch and an output terminal coupled to the output voltage node of the power supply system, each power channel being configured as a buck converter and including at least a high-side power switch and a low-side power switch connected in series;
measuring, at each power channel, a current flowing through the low-side power switch;
determining, at each power channel, that the current flowing through the low-side power switch has exceeded a current limit threshold; and
in response to the determining that the current flowing through the low-side power switch of a respective power channel having exceeded the current limit threshold, disabling the low-side power switch of the respective power channel and the load, wherein disabling the load switch in response to the determining comprises driving the control terminal of the main switch using the turn-off circuit to turn off the main switch in response to the determining.

12. The method of claim 11, wherein disabling the load switch comprises:
turning off the load switch in response to the determining to disconnect the input voltage from the output node of the load switch.

13. The method of claim 12, wherein disabling the load switch in response to the determining comprises:
turning off the load switch in response to the determining within a time duration to avoid damage to the power supply system.

14. The method of claim 12, wherein disabling the load switch in response to the determining comprises:
turning off the load switch in response to the determining within a time duration in the nano-seconds range.

15. The method of claim 11, wherein measuring, at each power channel, a current flowing through the low-side power switch comprises:
measuring, at each power channel, a peak current value of the current flowing through the low-side power switch; and
generating an output signal indicative of the peak current value.

16. The method of claim 15, wherein determining, at each power channel, that the current flowing through the low-side power switch has exceeded a current limit threshold comprises:
comparing the output signal indicative of the peak current value to the current limit threshold.

* * * * *